(12) United States Patent
Sotoodeh

(10) Patent No.: US 7,912,216 B2
(45) Date of Patent: Mar. 22, 2011

(54) ELLIPTIC CURVE CRYPTOSYSTEM OPTIMIZATION USING TWO PHASE KEY GENERATION

(75) Inventor: Mehdi Sotoodeh, Mission Viejo, CA (US)

(73) Assignee: SafeNet, Inc., Belcamp, MD (US)

( * ) Notice: Subject to any disclaimer, the term of this patent is extended or adjusted under 35 U.S.C. 154(b) by 1355 days.

(21) Appl. No.: 11/366,529

(22) Filed: Mar. 3, 2006

(65) Prior Publication Data
US 2007/0206789 A1    Sep. 6, 2007

(51) Int. Cl.
*H04L 9/00*    (2006.01)
(52) U.S. Cl. .................. 380/44; 380/45; 380/46; 380/47
(58) Field of Classification Search .............. 380/44–47
See application file for complete search history.

(56) References Cited

U.S. PATENT DOCUMENTS

| | | | | |
|---|---|---|---|---|
| 5,963,646 A | * | 10/1999 | Fielder et al. | 380/259 |
| 6,141,420 A | | 10/2000 | Vanstone et al. | |
| 6,209,091 B1 | * | 3/2001 | Sudia et al. | 713/175 |
| 6,618,483 B1 | * | 9/2003 | Vanstone et al. | 380/30 |
| 2006/0174126 A1 | * | 8/2006 | Crandall et al. | 713/176 |
| 2007/0206789 A1 | * | 9/2007 | Sotoodeh | 380/44 |

* cited by examiner

*Primary Examiner* — Thanhnga B Truong
*Assistant Examiner* — Angela Holmes
(74) *Attorney, Agent, or Firm* — Drinker Biddle & Reath LLP

(57) ABSTRACT

A computer-implemented method of generating an elliptic curve cryptosystem (ECC) signature includes the steps of: generating a first random key (k1) having n bits, where n is a natural number; calculating a first ECC point (V) from k1 and a base point; and storing k1 and V securely in a computer-readable medium. To digitally sign electronic data, the method further includes the steps of generating a second random key (k2), where k2 has fewer than n bits; calculating a second ECC point (Q) from V and k2; and digitally signing electronic data using Q.

7 Claims, 2 Drawing Sheets

ELLIPTIC CURVE CRYPTOSYSTEM OPTIMIZATION USING TWO PHASE KEY GENERATION

BACKGROUND OF THE INVENTION

1. Field of the Invention

The present invention relates generally to computer cryptography, and more particularly to elliptic curve cryptosystems (ECC).

2. Related Art

A well-known and common method of public key cryptosystems uses a pair of keys, one public and one private. The keys may be mathematically related such that data encrypted with the public key may only be decrypted with the private key and conversely, data encrypted with the private key can only be decrypted with the public key. Encrypted data can be verified as authentic when decrypted with the sender's public key. Similarly, data signed with a private key may be verified with the signer's public key.

The process of using digital signatures is a well-known way to protect and ensure that electronic data maintains its integrity when transmitted. Conventionally, the contents of the electronic data to be signed are used to create a digest, for example, with a one-way hash function. The digest is then signed with the sender's private key. The recipient may then use the sender's public key to decrypt the signed digest, re-create a digest from the sent data, and if the two digests are identical, be assured that the data has not been altered during transmission.

Two common forms of public key cryptosystems, ECC and RSA, are well-known in the art, and are explained, for example, in U.S. Pat. No. 6,141,420 (the '420 patent), which is incorporated by reference herein.

As explained, for example, in the '420 patent, RSA security, where two prime numbers p and q are multiplied to provide a modulus n, is based on the integer factorization problem. A public key e and a private key d are related such that their product e·d equals 1 (mod φ) where φ=(p−1)(q−1). Using RSA security requires the transmission of the modulus n and the public key. The security of the system derives from the difficulty of factoring a large number that has no relatively small factors.

Accordingly both p and q must be relatively large primes (e.g. at least 512 bits). With the RSA protocol, this results in at least a 1024 bit modulus and a 512 bit public key, which require potentially significant bandwidth and storage capabilities. Such security calculations also require more processing time, especially as security standards change to require larger and larger keys. RSA security consequently often needs dedicated hardware to perform the necessary calculations.

Elliptic Curve Cryptosystem (ECC) provides an advantage over RSA by providing similar levels of security with much smaller keys, e.g. less than 1024 bits, and often on the order of 163 bits.

As explained, for example, in the '420 patent, ECC encryption may make use of the discrete logarithm problem, which assumes that G is a finite group, and that a and b are elements of C. Then the discrete logarithm problem for G is to determine a value x (when it exists) such that $a^x=b$.

The effectiveness of using the discrete logarithm problem in encryption comes from the difficulty of determining the value x, which depends on the representation of G. For example, if an abstract cyclic group of order m is represented in the form of the integers modulo m, then the solution to the discrete logarithm problem reduces to the extended Euclidean algorithm, which is relatively easy to solve. However, the problem is made much more difficult if m+1 is a prime, and the group is represented in the form of the multiplicative group of the finite field $F_{m+1}$. The difficulty increases because the computations must be performed according to the special calculations required for operating in finite fields.

As further explained in the '420 patent, one known way to increase this difficulty is to use computations in a finite field whose members lie on an elliptic curve, that is by defining a group structure G on the solutions of $y^2+xy=x^3+ax^2+b$ over a finite field. The security provided by the use of elliptic curves is derived from the characteristic that an addition of two points on the curve can be defined as a further point that itself lies on the curve. Likewise the result of the addition of a point to itself will result in another point on the curve. Therefore, by selecting a starting point on the curve and multiplying it by an integer, a new point is obtained that lies on the curve. This means that where P=(x,y) is a point on an elliptic curve over a finite field $[E(F_q^a)]$, with x and y each represented by a vector of n elements then, for any other point R∈<P> (the subgroup generated by P), dP=R. To attack such a scheme, the task is to determine an efficient method to find an integer d, 0≦d≦(order of P)−1 such that dP=R. To break such a scheme, the best algorithms known to date have running times no better than $O(\sqrt{p})$, where p is the largest prime dividing the order of the curve (the number of points on the curve).

Thus, in a cryptographic system where the integer d remains secret, the difficulty of determining d can be exploited. Conventionally, in ECC signature generation, an elliptic curve is selected and a point P=(x,y), known as the generating point, is selected. Next, the sender chooses a random integer k as his private key. The sender then computes a point Q, Q=kP, which is another point on the curve, which becomes his public key that is made available to the receiver and the public. Although the receiver knows the value Q, due to the characteristic of elliptic curves noted above, he has great difficulty determining the private key k.

However, the generation of the public key from the one-time private key can take a considerable amount of time, and ECC may require a relatively large number of calculations.

What is needed then is an improved method of using ECC for digital signing that overcomes the shortcomings of conventional solutions.

SUMMARY OF THE INVENTION

In an exemplary embodiment of the present invention, a method and an apparatus for elliptic curve cryptosystem signing is disclosed.

In one exemplary embodiment, the present invention may be a computer-implemented method of generating an elliptic curve cryptosystem (ECC) signature comprising: generating a first random key (k1) having n bits, where n is a natural number; calculating a first ECC point (V) from k1 and a base point; storing k1 and V securely in a computer-readable medium; generating a second random key (k2), where k2 has fewer than n bits; calculating a second ECC point (Q) from V and k2; and digitally signing electronic data using Q.

In another exemplary embodiment, the present invention may be an apparatus for generating an elliptic curve cryptosystem (ECC) signature comprising: a computer interface, operative to send and receive electronic data from a computer; a computer-readable medium storing a first ECC point (V) calculated from a first random key k1, and a base point (P); and a processor, coupled to the computer interface and to the computer-readable medium, the processor adapted to execute program instructions that cause the processor to: generate a second random key (k2), where k2 has fewer bits than k1; calculate a second ECC point (Q) from V and k2; and digitally sign electronic data using Q.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF EMBODIMENTS OF THE PRESENT INVENTION

An exemplary embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

For the purposes of the following discussion, the following terms may have the following meanings.

A "computer" may refer to any apparatus that is capable of accepting a structured input, processing the structured input according to prescribed rules, and producing results of the processing as output. The computer can include, for example, any apparatus that accepts data, processes the data in accordance with one or more stored software programs, generates results, and typically includes input, output, storage, arithmetic, logic, and control units. Examples of a computer include: a computer; a general purpose computer; a supercomputer; a mainframe; a super mini-computer; a mini-computer; a workstation; a micro-computer; a server; an interactive television; a web appliance; a telecommunications device with internet access; a hybrid combination of a computer and an interactive television; a portable computer; a personal digital assistant (PDA); a portable telephone; a smartcard, a processor-based token; and application-specific hardware to emulate a computer and/or software. A computer can be stationary or portable. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" may refer to any storage device used for storing data accessible by a computer. Examples of a computer-readable medium include: a magnetic hard disk; a floppy disk; an optical disk, such as a CD-ROM or a DVD; a magnetic tape; a memory chip; a universal serial bus (USB) token; and a carrier wave used to carry computer-readable electronic data, such as those used in transmitting and receiving e-mail or in accessing a network.

Figure 1:
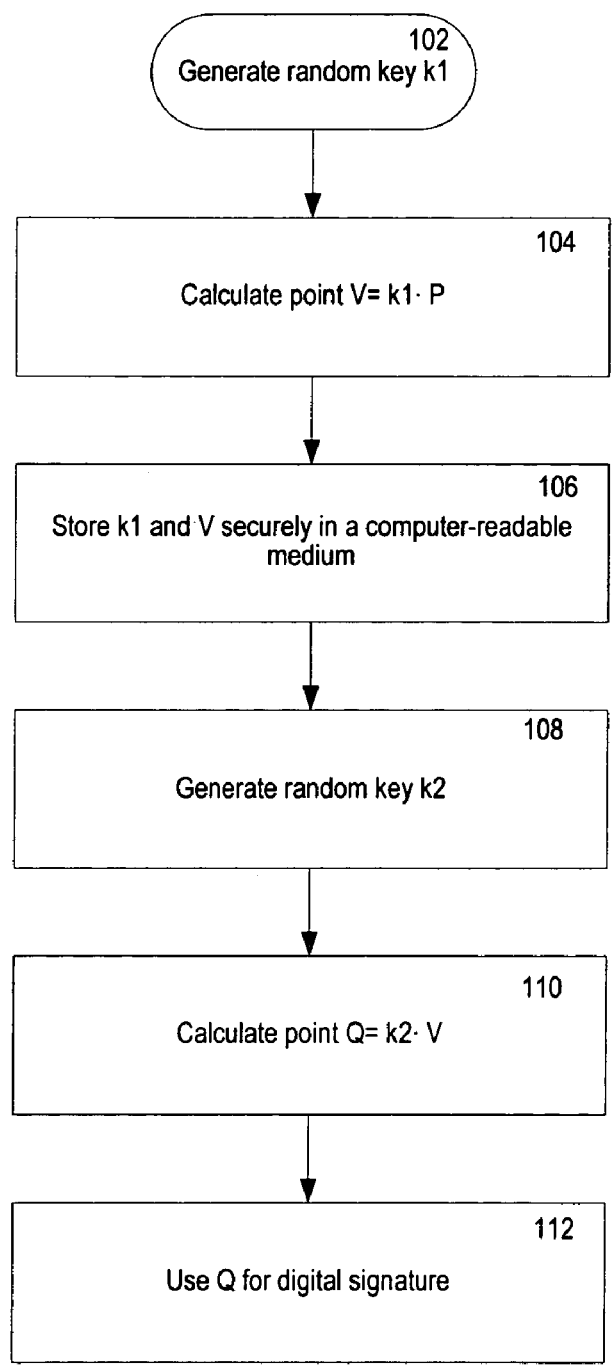
FIG. 1 depicts an exemplary embodiment of a flowchart depicting a method according to the present invention.

As seen in FIG. 1 in the flowchart 100, in an exemplary embodiment, a method of the present invention reduces the calculation of the public key Q=kP, and hence, the signature time of an ECC signature, by dividing the generation of the private key into two phases: a preparation phase, and a signature phase.

In the preparation phase, a random key k1 is generated in block 102, and used to generate a reference point V=k1·P in block 104. In practice, k1 may be the same size in bits as a conventional ECC random key, for example, on the order of 163 bits.

The values of V and k1 may be stored securely inside of a computer-readable medium in block 106. This may take place, for example, during the manufacturing process for the computer-readable medium, a device containing the computer-readable medium, or when the computer-readable medium is programmed or configured. A device containing the computer readable-medium may be, for example, a physically secured media, such as a universal serial bus (USB) token, a smart card, a processor based token, or an appliance.

When a signature is required, a second random key k2 is generated in block 108. The size of k2, in bits, may be smaller than the size of k1. In practice, k2 may be at least 80 bits. A new point Q, Q=k2·V, is calculated by the computer-readable medium in block 110, and used for the digital signature in block 112. The resulting signature may be the same as for a conventional ECC signature that calculates Q=k·P, where k=k1·k2. However, because k2 is less than k1 in number of bits, the actual time needed to produce the digital signature may be greatly reduced. For example, where a conventional ECC key might be 163 bits, in an embodiment of the present invention, k2 may only have 80 bits, improving the speed of digital signature generation by more than 50%. The key k2 may not be stored, or may be destroyed.

Figure 2:
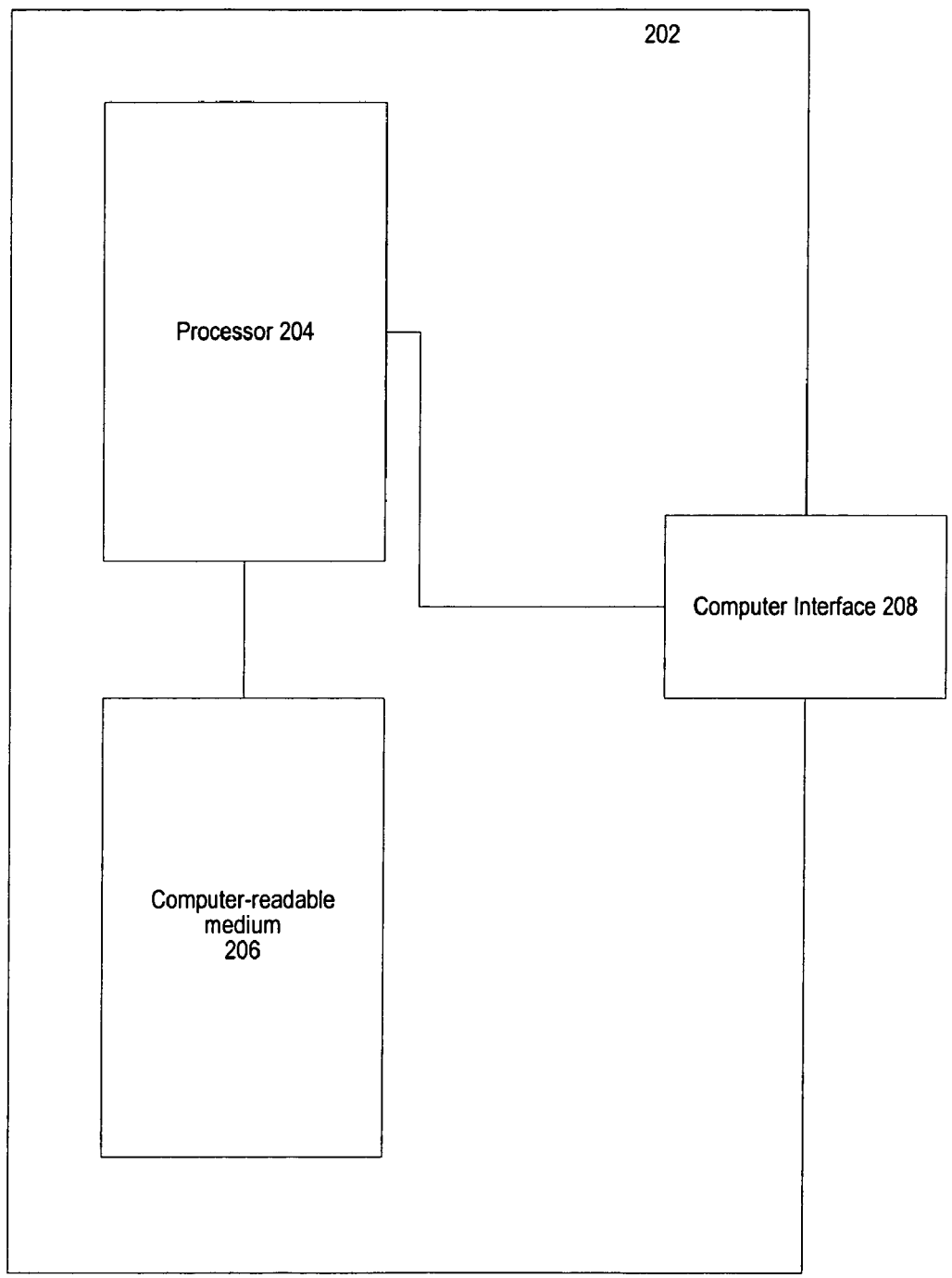
FIG. 2 depicts a block diagram of an exemplary embodiment of a computer-readable medium operative to perform the method according to the present invention.

FIG. 2 depicts a block diagram 200 of an exemplary device 202 that may be used to implement the method of the present invention. Device 202 may include a processor 204 coupled to a computer-readable medium 206 and to a computer interface 208. Device 202 may be a portable token outwardly coupled to a computer, for example, through a USB port. Device 202 may be installed alternatively within a computer, either permanently, or detachably.

Processor 204 may be any computer processor capable of performing the instructions Computer-readable medium 206 may be, for example, RAM, ROM, a hard disk, a flash memory, some combination thereof, or another medium capable of storing electronic data. Computer-readable medium 206 may serve to store the first reference point V and first random key k1. Computer-readable medium 206 may also store instructions for execution by processor 204.

Computer interface 208 may be, for example, a USB interface, a serial bus interface, a wireless interface, a wired interface, or any other interface capable of providing the result of a digital signature operation to a computer.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method of generating an elliptic curve cryptosystem (ECC) signature comprising:

a. generating a first random key (k1) having n bits, wherein n is a natural number;
b. calculating a first ECC point (V) from k1 and a base point;
c. storing k1 and V securely in a computer-readable medium;
d. generating a second random key (k2) by a signature generator, wherein k2 has fewer than n bits;
e. calculating a second ECC point (Q) by the signature generator from V and k2;
f. digitally signing electronic data by the signature generator using Q and k1*k2.

2. The method of claim 1, wherein k2 has about n/2 bits.

3. The method of claim 1, wherein said computer-readable medium comprises one of: a universal serial bus (USB) token, a read-only memory (ROM), a hard disk drive, a memory, a processor-based token, or a smart card.

4. The method of claim 1, further comprising:
g. destroying k2 after said step f.

5. The method of claim 4, further comprising:
h. generating a new random key (k3), wherein k3 is not the same as k2;
i. calculating a new ECC point (Q1) from V and k3; and
j. digitally signing electronic data using Q1.

6. An apparatus for generating an elliptic curve cryptosystem (ECC) signature comprising:
a computer interface, operative to send and receive electronic data from a computer;
a computer-readable medium storing a first ECC point (V) calculated from a first random key k1, and a base point (P); and
a processor, coupled to said computer interface and to said computer readable medium, the processor adapted to execute program instructions that cause the processor to:
generate a second random key (k2), wherein k2 has fewer bits than k1;
calculate a second ECC point (Q) from V and k2; and
digitally sign electronic data using Q.

7. The apparatus of claim 6, wherein the apparatus is a USB token and wherein said computer interface is a USB interface.

* * * * *